Jan. 7, 1969          R. E. LINKER          3,419,932
WINDSHIELD WIPER ASSEMBLY
Filed Aug. 3, 1967
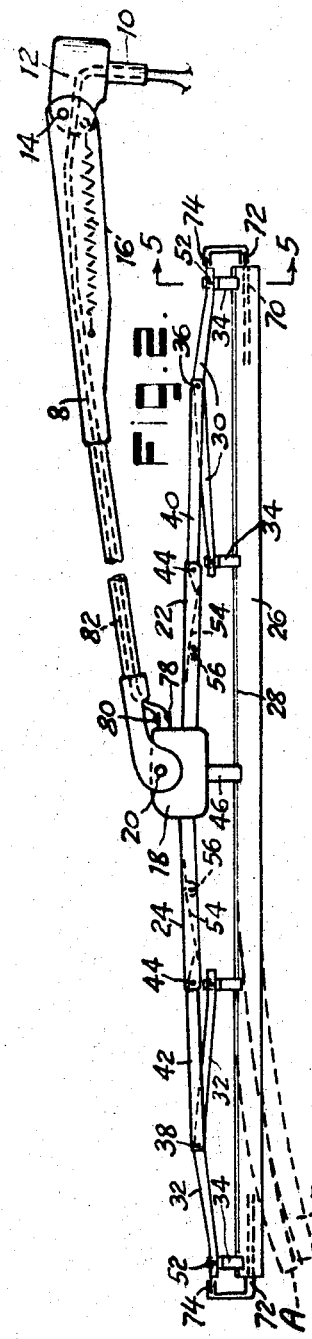
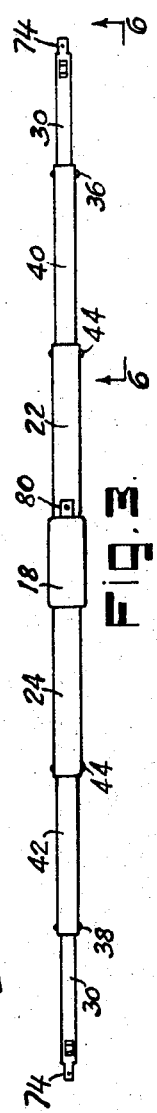
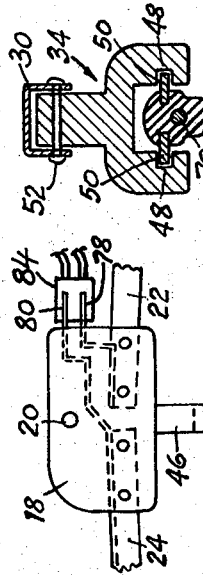
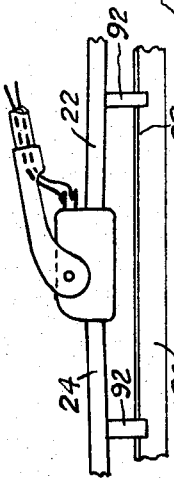
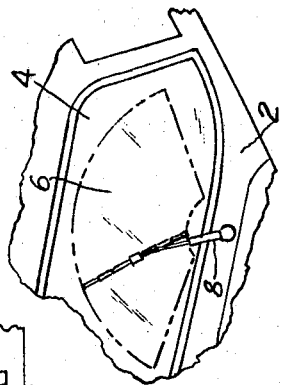
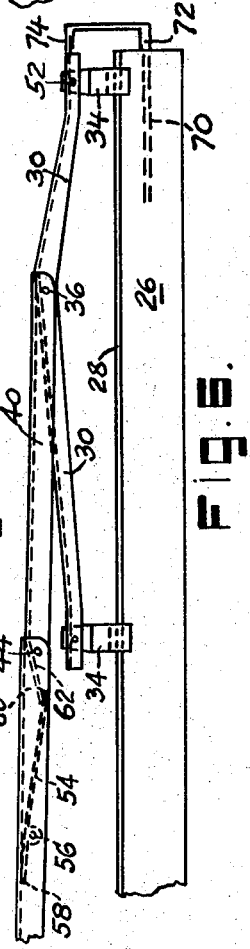
INVENTOR.
ROY E. LINKER
BY Sperry and Zoda
ATTORNEYS

United States Patent Office 3,419,932
Patented Jan. 7, 1969

3,419,932
WINDSHIELD WIPER ASSEMBLY
Roy E. Linker, Nursery Road, Titusville, N.J. 08560
Filed Aug. 3, 1967, Ser. No. 658,268
U.S. Cl. 15—250.06                    7 Claims
Int. Cl. B60s *1/04;* A47l *1/16*

ABSTRACT OF THE DISCLOSURE

A windshield wiper assembly which has an oscillating actuating arm urged toward the windshield, is provided with a connecting member pivotally secured to the actuating arm and lever elements secured to a wiper blade and backing strip. Means are then provided by which the lever elements and the wiper blade and backing strip are secured to the connecting member in such a way as to permit substantially independent flexing of portions of the wiper blade to conform to the curved surfaces of a windshield during oscillation thereof. At the same time the construction embodies means which assure the effective application of pressure to the backing strip and wiper blade throughout the length thereof.

The invention further is adapted for use, and is of particular advantage, in assemblies employing heating means associated with the wiper blade for promoting the removal of ice and snow from a windshield.

BACKGROUND OF INVENTION

This invention is directed to windshield wiper assemblies adapted for use on automobile, trucks, aircraft and elsewhere for removing water, ice, snow and fog from a windshield and is particularly adapted for use in wiping windshields which have a curved surface or a surface which varies in contour within the area over which the wiper blade is movable.

The problems presented in effectively wiping the windshields of automobiles of modern design have presented numerous difficulties due to the fact that it is not always possible to apply uniform or adequate pressure to the wiper blade as it moves back and forth over a curved surface. Moreover, when snow, sleet or ice collect on the windshield there is a tendency for the wiper blade to ride over such accumulations and to cause the pressure exerted on the blade to be unevenly or improperly distributed whereby the ice accumulation will be inadequately removed or may even to increase on some areas of the windshield while excessive pressure may be applied in other areas, tending to scratch the windshield.

In accordance with the present invention, these and other objections and limitations inherent in constructions of the prior art are overcome and novel windshield wiper assemblies are provided which permit the wiper blade and its backing strip to be flexed substantially independently at various points throughout the length thereof so as to apply more nearly uniform and adequate pressure to the wiping blade as it oscillates over a contoured windshield.

These and other objects and features of the present invention are preferably attained by providing a spring pressed oscillating actuating arm with a connecting member which is pivotally secured to the actuating arm near the free end of the arm, and has supporting members fixedly secured thereto and extending in opposite directions from the connecting member and generally parallel to the wiper blade. The wiper blade and its backing strip may be of conventional form and are provided with lever elements located near the opposite ends thereof. The lever elements themselves are each pivotally connected between the ends thereof to one end of a link which, in turn, has its opposite end pivotally connected to one of the oppositely extending supporting members. Independently operable spring means are interposed between the links and their associated lever members to yieldably urge the end portions of the wiper blade toward the windshield.

In the preferred form of the invention the connecting member on the actuating arm, or the supporting members fixedly secured to the connecting member are provided with means which urge the central portion of the wiper blade toward the windshield so as to aid in distributing the pressure applied to the wiper blade throughout the length thereof. Furthermore, as shown in the drawings the connecting member and other elements of the assembly may be constructed for use in combination with an electrically heated windshield wiper blade, such as that described and claimed in applicant's issued U.S. Patent No. 3,201,818, for example.

THE DRAWINGS

In the drawings FIG. 1 is a perspective illustrating a portion of an automobile having a curved windshield together with a typical windshield wiper assembly embodying the present invention;

FIG. 2 is a side elevation of a portion of the windshield wiper assembly illustrated in FIG. 1;

FIG. 3 is a top view of that portion of the assembly shown in FIG. 2;

FIG. 4 is a longitudinal sectional view through the connecting member and supporting elements of the assembly shown in FIGS. 1 to 3;

FIG. 5 is a transverse sectional view through the assembly shown in FIG. 2 taken on the line 5—5 thereof;

FIG. 6 is a longitudinal sectional view through the pivotally connected portions of one of the links and lever members taken on the line 6—6 of FIG. 3, and FIG. 7 is a side elevation of a modified form of connecting member and supporting elements embodying the present invention.

*Preferred embodiments of the invention*

In that form of the invention chosen for purposes of illustration in FIGURES 1 to 6 of the drawing, the windshield wiper assembly is mounted on an automobile 2 in position to oscillate back and forth over the outer surface of a curved windshield 4, to clean an area such as that shown at 6 in FIG. 1. The assembly includes the actuating arm 8, which may be of any conventional or preferred type, but as shown in FIG. 2, is secured to a motor driven oscillating shaft 10 and is pivotally connected to the head 12, fixed to the shaft 10 as indicated at 14. The free end of the arm 8 is urged toward the windshield 4 by spring means such as that indicated at 16.

Further, as shown in FIG. 2, a connecting member 18 is pivotally connected at 20 to the free end of the actuating arm 8 and supporting members 22 and 24 are fixedly secured to the connecting member 18 and extend in opposite directions therefrom. The supporting members 22 and 24 are positioned in substantial alignment with the wiper blade 26 mounted on a longitudinally flexible backing strip 28. The wiper blade 26 may be of any suitable or preferred construction, but as shown in the drawings, the wiper blade is prefreably adapted to be electrically heated when desired and for this purpose is preferably constructed as shown in applicant's issued Patent No. 3,201,818.

Lever elements 30 and 32 are located near the opposite ends of the wiper blade and backing strip, and are preferably connected to the backing strip 28 by holding means 34, positioned near the opposite ends of the lever elements 30 and 32. The lever elements 30 and 32 are, in turn, pivotally connected at the points 36 and 38 adjacent the outer ends of links 40 and 42, whereas the inner ends of the links 40 and 42 are pivotally connected at 44 near the outer ends of the oppositely extending supporting members 22 and 24 respectively. In the preferred form of the invention illustrated, the connecting member 18 is also provided with a holding means 46 which is fixedly mounted on the connecting member 18 and positioned adjacent the mid-portion of the wiper blade 26.

Further, as shown in FIG. 5, the holding members 34 and 46 by which the wiper blade and its backing strip 28 are carried are formed with opposed grooves 48 adapted to receive the opposite edges 50 of the backing strip 28 so as to hold the wiper blade and backing strip in place in the assembly while permitting the backing strip and wiper blade to slide longitudinally of the holding members and along the grooves 48 when the blade and backing strip are flexed adjacent the ends thereof. Moreover, as shown in FIGS. 2 and 5, the holding means 34 may themselves be pivotally mounted at 52 on the lever elements 30 and 32, whereby the end portions of the wiper blade and backing strip may be flexed readily toward and away from the windshield and into position to conform accurately to the curved or contoured surface of the windshield during oscillation of the wiper blade across the windshield. At the same time the holding means 46 mounted on the connecting member 18 is held in fixed position on the assembly and serves to aid in preventing undesired longitudinal movement or displacement of the wiper blade and backing strip during operation of the device.

The supporting members 22 and 24 are each provided with spring means 54 which may surround a pin 56 and are provided at one end with an extension 58 which bears against the supporting means, whereas the opposite end 60 of the spring means 54 bear against the inner surfaces of the extensions 62 of the links 40 and 42 so as to tilt the outer ends of the links 40 and 42 about the pivots 44 on the supporting means 22 and 24. In this way the spring means 54 urge the lever members 30 and 32 and the opposite portions of the wiper blade and backing strip into wiping engagement with the surface of the windshield at all times during oscillation of the windshield wiper assembly.

The combination of elements thus provided provided effectively serves to urge both the opposite end portions of the wiper blade 26 and the mid-portions of the blade toward the windshield as it moves back and forth over the surface thereof. Furthermore, the lever member 32 and link 42 associated with the outer end portions of the backing strip 28 and wiper blade 26 are urged toward the surface of the windshield as it passes about the curved or contoured surface of the windshield at the sides thereof. The wiper blade is therefore capable of assuming the position indicated at A in FIG. 2 of the drawings without lifting the mid-portion of the blade beneath the connecting member 18 off the surface of the windshield. The opposite end portions of the wiper blade 26 and backing strip 28 are each instead movable substantially independently of the remaining portions of the blade whereby the pressure applied to the wiper blade is substantially uniformly distributed throughout the length thereof. On the other hand, in the event the curvature of the windshield is such as to require the wiper blade to assume the dotted line position indicated at B in FIG. 2, the connecting member 18 with the supporting members 22 and 24 may tilt about the pivot 20 and with respect to the free end of the actuating arm 8 whereby the wiper blade 26 is caused to follow and conform to the contour of the surface of the windshield despite wide variations in the curvature thereof. The action of the holding means 34 carried by the lever elements 30 and 32, and the action of the holding means 46 carried by the connecting member 18, is such as to assure effective and substantially uniform application of pressure and wiping action of the blade 26 continuously throughout the oscillation of the wiper blade across the area 6 of the windshield as illustrated in FIG. 1. Moreover, the application of excessive pressure to the wiping blade and backing strip at any point throughout the length thereof will be prevented so that the blade will not at any time scratch the surface of the glass during the wiping operation.

While the advantages of the present invention and the operation of the windshield wiper blade are of importance, at all times when the windshield wiper assembly is in use, the invention is of particular importance when the windshield wiper blade 26 is employed for removing snow, ice or sleet from the windshield. For this purpose the windshield wiper blade 26 may be provided with a heating element and preferably is of the type described and claimed in applicant's issued Patent No. 3,201,818. The heating element thus provided is indicated at 70 in FIGS. 2 and 5 and is formed with a projecting end connector 72 adapted to be electrically connected to the projections 74 on the outer ends of the lever elements 30 and 32. The connecting element 18 mounted on the free end of the actuating arm 8 may then be constructed as shown in FIG. 4, wherein the electrical connector 78 is formed integral with the supporting member 22 and the electrical connector 80 is formed integral with the supporting member 24. Electrical leads extending from a source of current and extending to a grounded element may then be connected to the connectors 78 and 80 and may extend through the actuating arm 8 as indicated at 82.

In the construction thus provided, current may be passed through the connector 78 to the supporting member 22, link 40 and lever element 30 to the right hand end of the heating element 70 in the windshield wiper blade 26 as shown in FIG. 2. Current then returns from the opposite end of the heating element through projection 74, lever element 32 and link 42 to the supporting member 24 and connector 80 in the supporting member 18. In this way it is possible to heat the blade whenever such heating is necessary or desired to remove snow, frost or sleet from the surface of the windshield. The electrical leads 82 may be provided with a suitable plug or connector 84, for ready attachment to or detachment from the connectors 78 and 80 on the connecting member 18. In this way, the connecting member with its supporting members, lever elements, and windshield wiper may be entirely detached from the actuating arm 8 by removal of the hinge pin 20. As a result, the various elements of the windshield wiper assembly may be connected and disconnected for replacement, repair, or otherwise, with very little difficulty.

Although the connecting member 18 may be provided with a single centrally located holding member 46 for urging the central portion of the wiper blade 26 toward the windshield, it is possible, if desired to employ a construction as shown in FIG. 7. As there illustrated the supporting members 22 and 24 are each provided with a holding member as indicated at 92 and 94 respectively. The latter holding members are thus spaced apart so as to permit the use of the invention with relatively long or "oversize" windshield wipers and in special applications wherein it is desirable to limit or prevent excessive tilting movement of the holding member 18 with respect to its connection with the actuating arm 8 of the windshield wiper assembly.

In either form of the invention illustrated the characteristic and substantially uniform pressure exerted on the windshield wiper blade at all times during operation facilitates the removal of ice and sleet from the windshield and prevents the wiper blade from buckling or riding ineffectively over localized accumulations of ice or snow which may form on the surface of the windshield. At the same time the substantially independent flexing of the various portions of the windshield wiper blade as it travels over the curved surface of a windshield, assures the effective removal of ice and snow which may accumulate on the curved outer surface of the area 6, as well as the flat surfaces over which the windshield wiper blade is movable.

The embodiments of the invention shown in the drawings and described above are preferred. However, it will be apparent that the shape and style of windshield wiping blade and backing member employed may be varied considerably in any application of the present invention. Furthermore, the various elements of the combinations may be altered or modified in construction and relation one with another, in order to attain the advantages of the present invention in various installations. In view thereof, it should be understood that the particular embodiment of the invention shown in the drawings and described above is intended to be illustrative only, and is not intended to limit the scope of the invention.

What is claimed is:

1. A windshield wiper assembly including an actuating arm which is spring urged toward a windshield, a connecting member pivotally attached to said actuating arm and having supporting members fixedly connected to said connecting member and extending in opposite directions therefrom, a windshield wiper blade, a backing strip by which said blade is carried, lever elements positioned adjacent the opposite ends of the wiper blade and connected to said backing strip, links pivotally connected at the opposite ends thereof to said lever elements and supporting members, and spring means interposed between said lever elements and said supporting members and acting on said links for urging said backing strip and wiper blade toward said windshield.

2. A windshield wiper assembly as defined in claim 1, wherein the lever elements and links connected to each of said supporting members are independently movable relative to said connecting member toward and away from said windshield.

3. A windshield wiper assembly as defined in claim 2, wherein said spring means are interposed between said lever elements and supporting members and engageable with said links for urging said backing strip and wiper blade toward the windshield.

4. A windshield wiper assembly as defined in claim 1, wherein holding means extend between said backing strip and an element of the assembly and are located near the mid-portion of said wiper blade for urging said mid-portion of the wiper blade toward the windshield.

5. A windshield wiper assembly as defined in claim 1, wherein holding means engageable with said backing strip are pivotally connected to said lever elements.

6. A windshield wiper assembly as defined in claim 1, wherein a heating element is associated with said wiper blade and electrically connected to contact elements mounted on said connecting member.

7. A windshield wiper assembly as defined in claim 1, wherein holding means on said connecting member and lever elements engage said backing strip for supporting the backing strip and wiper blade.

References Cited

UNITED STATES PATENTS

| | | | |
|---|---|---|---|
| 2,739,337 | 3/1956 | O'Shei | 15—250.42 |
| 2,807,822 | 10/1957 | Scinta | 15—250.32 |
| 2,859,468 | 11/1958 | O'Shei | 15—250.42 |
| 2,915,769 | 12/1959 | Ryck | 15—250.33 |
| 3,022,532 | 2/1962 | Zaiger | 15—250.42 |

PETER FELDMAN, *Primary Examiner.*

U.S. Cl. X.R.

15—250.32, 250.42